E. G. NIESS-WANER.
VEHICLE TIRE.
APPLICATION FILED JAN. 20, 1921.
1,436,672.
Patented Nov. 28, 1922.
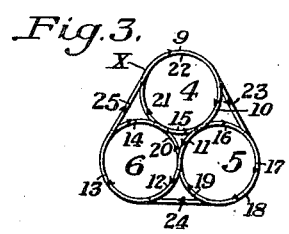
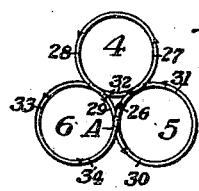
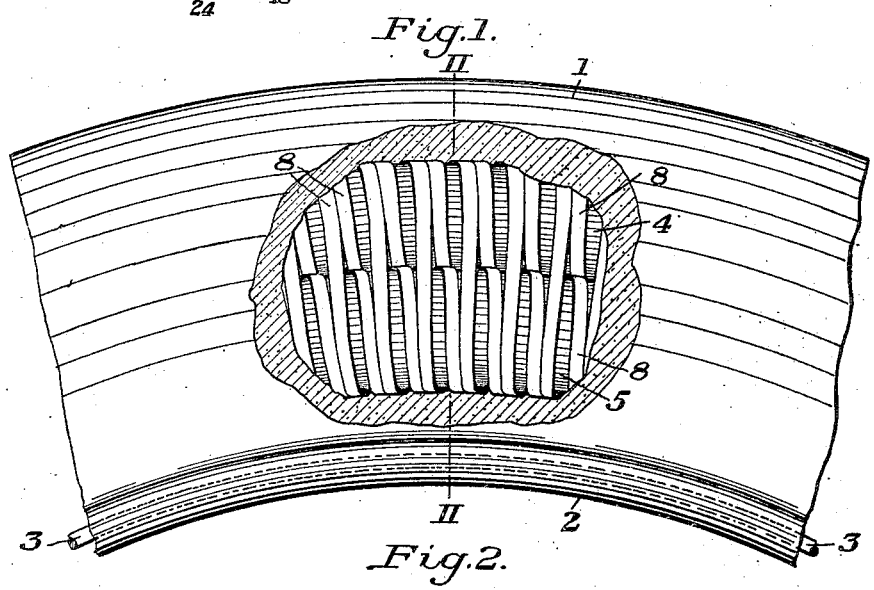
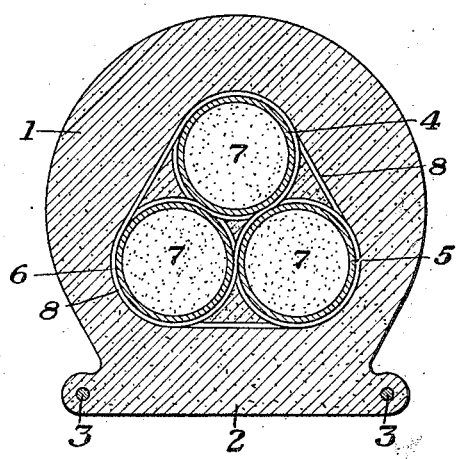
INVENTOR.

Patented Nov. 28, 1922.

1,436,672

UNITED STATES PATENT OFFICE.

EDWIN G. NIESS-WANER, OF PITTSBURGH, PENNSYLVANIA.

VEHICLE TIRE.

Application filed January 20, 1921. Serial No. 438,735.

*To all whom it may concern:*

Be it known that I, EDWIN G. NIESS-WANER, a citizen of the United States, residing at Pittsburgh, in the county of Allegheny and State of Pennsylvania, have invented a new and useful Improvement in Vehicle Tires, of which the following is a full, clear, and exact description.

My invention relates to vehicle tires and particularly to elastic or cushion tires as distinguished from pneumatic tires.

It was my object in making this invention to provide a structure which would be resilient enough for ordinary purposes and at the same time of such mechanical construction as to insure a longer useful life than has been secured with tires of this general class as heretofore constructed.

I had the further object in view of producing a tire which has a greater amount of resilience than is possessed by tires of this class as heretofore constructed.

My invention will be better understood and many other advantages will be apparent from the following specification, taken in connection with the following drawings, in which:

Figure 1 is a side elevation partly in section of a portion of a tire embodying my invention;

Figure 2 is a cross section on line II—II of Figure 1; and

Figures 3 and 4 are diagrammatic illustrations of the manner of applying the reinforcing strips.

The main body or casing 1 of the tire is composed of rubber compound or rubber-like material which is molded to the desired shape and size with a base 2 in each side of which may be placed a cable 3. The casing 1 is molded around the interior chambers 4, 5 and 6. These chambers are filled preferably with an impalpable mineral substance 7. I have found that finely ground graphite has many advantages in that it has the property of "flowing" somewhat similar to the property of water and at the same time it has a small degree of compressibility; and furthermore it is self-lubricating, which quality renders the generation of heat a minimum.

The chambers 4, 5 and 6 may be provided with walls of any suitable material such as rubber and the chambers are preferably independent of each other. These chambers after being filled with the material 7 are reinforced individually and collectively and by such reinforcing means they are connected in such manner as to preserve their relative relation when the tire is subjected to most rigid commercial service.

The reinforcing means may take various forms but I have illustrated in the accompanying drawings two preferred ways in which the reinforcing means may be applied.

In Figure 3 is illustrated diagrammatically one of the ways of applying the reinforcing means. The preferred reinforcing means is a metal ribbon 8, preferably of brass. This ribbon may be a strip of metal or may be made of wire woven flat. The thickness and width of the ribbon 8 may be changed to suit the size of the tire and also to some extent dependent upon the use to which the tire is to be put.

Referring to Figure 3, starting at the point X, the ribbon is wound as indicated by the arrow heads and the numbers, the numbers being consecutive in the direction of the winding. The ribbon is wound over the sections 9 and 10 of the chamber 4, section 11 of the chamber 5, sections 12, 13 and 14 of the chamber 6, section 15 of the chamber 4, sections 16, 17, 18 and 19 of the chamber 5, section 20 of the chamber 6, sections 21 and 22 of the chamber 4 and around the three chambers collectively at the sections shown at 23, 24 and 25 back to the point of starting.

A careful study of the above diagram will show that the ribbon extends around each of the chambers approximately one and one-quarter turns in a clockwise direction and a one-quarter turn in a counter-clockwise direction, and that the tape comes into separate contact with each chamber at three different times approximately in a distance of one-quarter turn, a one-half turn and a three-quarter turn. This method of reinforcing and cross connecting the chambers securely holds them together and at the same time reinforces the sections throughout their length. This reinforcement is aided by the molding of the casing material 1 around the sections and in the space between the sections, which casing material after being molded, as shown in Figure 2, is vulcanized, and in the vulcanizing process the rubber compound very firmly and securely attaches itself not only to the wall of each of the chambers which is of rubber, but also to the reinforcing and cross connecting ribbon 8. This construction greatly aids in maintaining the chambers in the position indicated in Figure 2.

The arrangement of the chambers, as shown in Figure 2, is important, in that two of the chambers are arranged parallel with the base of the tire and the third chamber is placed between the other two chambers radially and outside of the said chambers annularly so that when the compression force is applied to the tread of the tire as the various parts assume the weight of the vehicle on which the tire is placed, this force is transmitted through a chamber 4 equally to the chambers 5 and 6, and in a direction at an angle along the line joining the center of the chamber 4 with the respective centers of the chambers 5 and 6. This distribution of forces produces a cushioning effect which is different and distinct from the inherent elastic and compressible qualities of the materials of the casing and the material inside the chambers, and in that manner an additional resilience or cushioning effect is produced by reason of the construction as shown in section in Figure 2.

In Figure 4 is shown another way of arranging the reinforcing and cross connecting means, as follows:—

Starting at the point marked A the ribbon is carried around as indicated by the arrow heads and in the order indicated by the numerals, that is to say, section 26 around the chamber 5, sections 27 and 28 around the chamber 4, section 29 around the chamber 6, sections 30 and 31 around the chamber 5, section 32 around the chamber 4, sections 33 and 34 around the chamber 6. From a careful study of Figure 4, it will be noted that the ribbon passes one revolution around each of the chambers and that in each instance the ribbon passes three-quarters around each of the sections counter-clockwise and one-quarter in a clockwise direction and that the ribbon engages with each chamber at two different times. This arrangement of the reinforcing and cross connecting means is very effective in maintaining the chambers in their proper relation to each other as shown in Figure 2.

My invention has the advantages that the construction is simple and that the degree of resilience is proportionately great by reason of the construction as shown and described. It has the further advantage that the interior chambers are securely held in correct relationship to secure the above advantages, and furthermore the material used as a filler for the interior of the chambers is itself slightly compressible and inherently self-lubricating, which results in the advantages of low temperature change by reason of friction and it also has many other advantages which are effective in prolonging the life of the tire.

A further advantage of my invention resides in the fact that by reason of the secure manner of cross connecting and reinforcing the chambers, they maintain their proper relation even after the tread has been worn down and therefore the tire may be retreaded and thereby restored to its original value.

Many changes may be made in the arrangement of the cross connecting and reinforcing means without departing from the spirit of my invention and also many kinds of material may be used as the reinforcing and cross connecting means without departing from my invention, and I desire it to be understood that my invention is by no means limited to the exact manner of applying the reinforcing and cross connecting means nor to the material of such means. Other material than that specified may be used as a filler for the chambers and many advantages of my invention secured, although graphite or other material having many similar qualities is preferred. Many other changes may be made in the details of construction without departing from the spirit of my invention.

I claim:

1. A vehicle tire having a plurality of separate interior chambers, and means for reinforcing and connecting said chambers together, substantially as described.

2. A vehicle tire having a plurality of separate interior chambers filled with slightly compressible material, and means for reinforcing and connecting said chambers together, substantially as described.

3. A vehicle tire having an interior chamber filled with a powdered non-granular material, and means wrapped around said chamber for reinforcing the walls thereof, substantially as described.

4. A vehicle tire comprising a casing of rubber-like material, a chamber inside said casing, powdered material, between the particles of which there is substantially no friction, filling said chamber, and means wrapped around said chamber for reinforcing the walls thereof, substantially as described.

5. A vehicle tire, comprising a casing and a plurality of chambers therein and continuous means wrapped around said chambers for reinforcing the walls thereof, substantially as described.

6. A vehicle tire, comprising a casing and a plurality of chambers therein, and a single means reinforcing all of said chambers, substantially as described.

7. A vehicle tire, comprising a casing, a plurality of independent chambers therein, and powdered graphite filling said chambers, substantially as described.

8. A vehicle tire, comprising a casing, a plurality of independent chambers therein filled with a substance having the properties of a slightly compressible fluid, and means reinforcing said chambers, substantially as described.

9. A vehicle tire, having a solid tread and a reinforced chamber embedded in said tread and filled with a substance having the characteristics of a slightly compressible fluid, substantially as described.

10. A vehicle tire, having a reinforced chamber filled with a substance having the characteristics of a slightly compressible fluid, a continuous strip surrounding and reinforcing said chamber and a covering of rubber-like material molded around said chamber, substantially as described.

11. A vehicle tire, comprising a plurality of chambers, a solid substance having the properties of a slightly compressible fluid filling said chambers and a casing molded around said chambers and filling any space there may be between said chambers, substantially as described.

12. A vehicle tire, comprising a plurality of chambers, a substance having the properties of a slightly compressible fluid filling said chambers, reinforcing means for said chambers, and a casing molded around said chambers and filling any space there may be between said chambers and embedding said reinforcing means, substantially as described.

13. A vehicle tire, having a chamber, impalpable mineral powder having substantially no friction between particles filling said chamber and a casing surrounding said chamber, substantially as described.

14. A vehicle tire, having a plurality of chambers, impalpable mineral matter filling said chambers, and a brass ribbon wrapped around the walls of said chambers and a rubber composition molded around said chambers, substantially as described.

15. A vehicle tire, having a plurality of chambers, impalpable mineral matter filling said chambers, a member cross-connecting said chambers together and reinforcing said chambers, and a rubber composition surrounding said chambers, substantially as described.

16. A vehicle tire, comprising a plurality of independent chambers, impalpable mineral matter filling said chambers, means cross-connecting and reinforcing said chambers, and a molded rubber composition incasing said chambers and said means, substantially as described.

In testimony whereof, I have hereunto set my hand.

EDWIN G. NIESS-WANER.